April 21, 1964  H. M. RATHBUN ETAL  3,130,299
COMPUTING APPARATUS FOR CONTROLLING PROGRAM INSTRUCTIONS
Filed Nov. 7, 1960                                   2 Sheets-Sheet 1

INSTRUCTION REGISTER        CONTROL REGISTER

*INVENTORS*
HOWARD M. RATHBUN
STEPHEN A. RICHARDSON
BY
*Charles L. Johnson Jr.*
ATTORNEY

United States Patent Office 3,130,299
Patented Apr. 21, 1964

3,130,299
COMPUTING APPARATUS FOR CONTROLLING PROGRAM INSTRUCTIONS
Howard M. Rathbun, Millburn, and Stephen A. Richardson, Boonton, N.J., assignors to Monroe Calculating Machine Company, Orange, N.J., a corporation of Delaware
Filed Nov. 7, 1960, Ser. No. 67,674
1 Claim. (Cl. 235—157)

This invention relates generally to computing apparatus and more particularly to apparatus for controlling the sequence of operations of computing devices.

The design of modern computing apparatus involves in many respects a compromise between exotic and complex physical arrangements on the one hand and complex and lengthy programming criteria on the other. The invention described herein is submitted as an advance in the art of computing apparatus generally and in the art of sequential control in particular.

It is therefore one object of this invention to provide improved apparatus for the sequential control of computing devices.

It is a further object of invention to provide improved methods of controlling the operation of computing devices.

Another object of the invention is to provide apparatus for automatically sequencing the steps of a computing process regardless of the order of occurrence of the steps.

Still another object of the invention is to provide an improved method of automatically sequencing the steps of a computing process regardless of the order of occurrence of the steps.

These and other objects and novel features of the invention are set forth in the appended claim and the invention as to its organization and its mode of operation will best be understood from a consideration of the following detailed description of the preferred embodiment when used in connection with the accompanying drawings which are hereby made a part of the specification, and in which:

Figure 1:
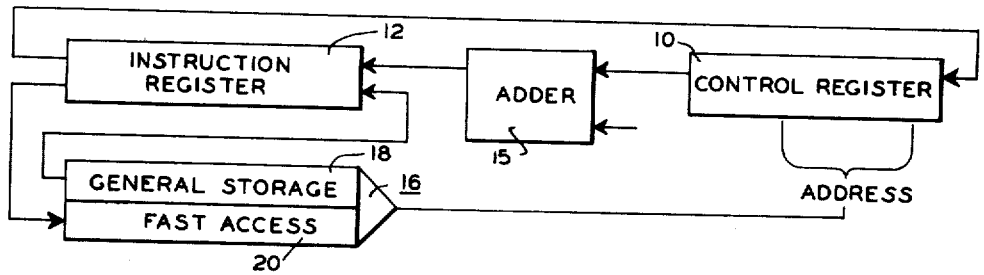
FIG. 1 is a block diagram representation of the invention's apparatus.

The preferred embodiment of this invention, as illustrated in FIG. 1, successfully accomplishes the stated objects by providing an improved method and apparatus for controlling the sequential operation of computing devices. It consists of two registers which may be designated as the control or shift register 10 and the instruction register 12. Collectively these two registers will be designated as the control loop.

Figure 7:
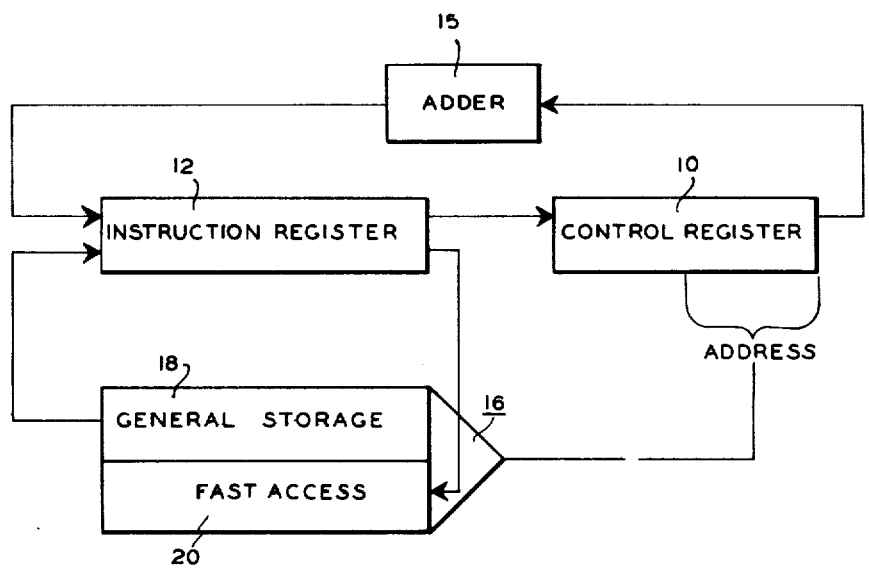
FIG. 7 is a block diagram illustrating the direction of flow of serial pulses through the apparatus shown in FIG. 1.

FIG. 7 illustrates the schematic arrangement by which the serial train of pulses progress through the computer. It should be noted that this is at variance with the direction of instruction flow shown in FIG. 1. The FIG. 1 drawing is utilized herein as the basis for description while the electrical progression of pulse information follows the direction of flow through the apparatus as illustrated by FIG. 7. It is to be realized that the adder, registers and other storage members may be any of several well-known commercially available types.

The function of the control register 10 is to decode the commands and addresses which the computer will execute while the instruction register 12 acts as a fast access storage for the control register. The control register holds one instruction while the instruction register may hold one or more instructions. Each instruction may comprise as many tetrads as would be advantageous for a particular system. All instructions are transferred to the instruction register from storage registers before they can be decoded in the control register. The means for loading the instruction register are designated as jump instructions.

Figure 2:
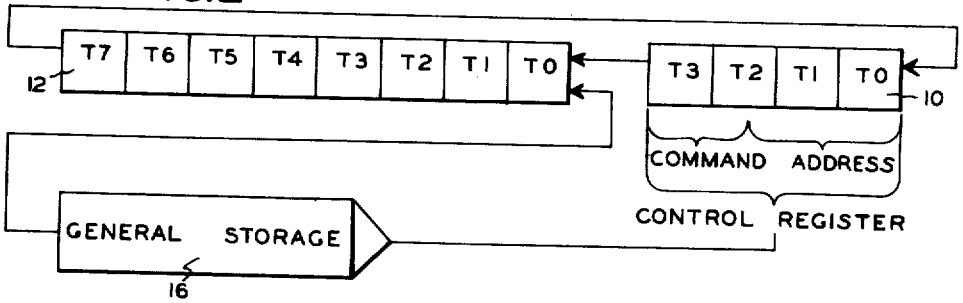
FIG. 2 is a block diagram of the control loop portion of the invention.

The computer described has four control or jump instructions which permit conditional and unconditional branching of program control. FIG. 2 shows the control loop which comprises the control register and instruction register. As can be seen from this figure, three instructions are present in the control loop. Two of these instructions are present in the instruction register while the one currently being executed is in the control register. Of these three instructions at least one must always be a jump instruction in order to load the instruction register with the next two instructions in the program sequence.

FIG. 1 illustrates the apparatus by which the objects of the invention are realized. There, it may be seen, a control register 10 feeds an instruction register 12 by means of adder 15. A storage unit 16 contains a general storage portion 18 and a fast access storage portion 20. The fast access storage 20 is connected with the instruction register 12 so as to permit the transfer of the instruction register words to the fast access storage register when the control register so directs.

It should be understood that transfer of this nature is not limited to a fast access storage but that any storage arrangement may be utilized, including those of the drum or core type. The general storage unit 16, under control of the control register 10, transfers instructions to the instruction register from the storage registers. The adder 15 may or may not add a "one" to the instruction passing from the control register to the instruction register, depending upon the program sequencing desired.

In the preferred embodiment the storage registers are all addressable by the program except the instruction register which is automatically addressed. The instruction register is made up of eight tetrads designated T0–T7. Both the instruction register and the storage register are contained on a rotating drum while the control register of four tetrads T0–T3 are of the flip-flop type.

Program sequencing operates by the jump instruction bringing the contents of the desired register into the instruction register, executing the two instructions in the control register, and then automatically bringing the next register in sequence into the instruction register unless one of the instructions executed was a jump instruction. This jump instruction would have loaded the contents of the instruction register with two instructions and started a new automatic sequence.

Figure 3:
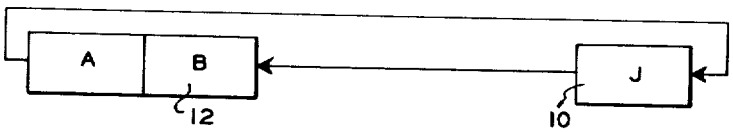
FIGS. 3–6 illustrate the program sequencing of the invention.
Figure 4:
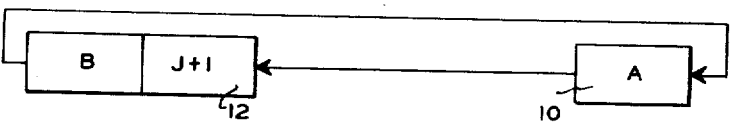
Figure 5:
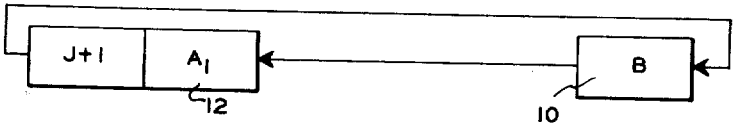
Figure 6:

The FIGS. 3 through 6 show how the program sequencing operates. FIG. 3 shows a jump instruction in the control register. This jump instruction has loaded the instruction register with the contents of the storage register addressed by the jump command J. The computer then automatically shifts the A step from the instruction register into the control register. The B step meanwhile moves up to replace the A step. The jump instruction has a one automatically added to its address portion and is moved into the position vacated by the B step. FIG. 4 shows this operation. After the A step in the control or shift register has been executed, the B step is shifted into the control register. The augmented jump command (J+1) moves into the vacated B step position, and the executed A step into the position previously occupied by the jump command. FIG. 5 shows this operation. Once the B step has been executed, the entire process is repeated with the control register being loaded with the jump command with its address increased by one. FIG. 6 illustrates this operation. In this manner automatic sequencing will continue unless either the A step or the B step contains a jump instruction. This jump command will load the instruction register as in FIG 3 and then have its address augmented automatically to start a new automatic sequence.

Although three instructions are constantly circulating in the control loop, the only time a jump instruction need be programmed occurs when the control sequence is to be changed from being automatically sequenced by the computer.

On the execution of instructions from the instruction register, the A step is always executed first, followed by the B step. This is the normal sequence. FIGS. 3 to 6 show this sequencing.

The jump command which accomplishes the automatic sequencing is the unconditional jump. Any other jump commands which may load the instruction register become unconditional jumps in the control loop after they have passed through the control register.

The pump unconditional command replaces the contents of the instruction register with the contents of the addressed register. The previous sequence of instructions is interrupted, and a new sequence starting with the A step of the addressed register is started. The contents of the addressed register are unchanged by this command and may include such information as field size and decimal point location.

The operation of the jump return or jump mark command will be described in reference to FIG. 1. The jump mark command replaces the contents of one of the fast access registers with the contents of the instruction register while replacing the contents of the instruction register with the contents of the addressed register. In another embodiment these operations may not occur simultaneously. The previous sequence of instructions is interrupted and a new sequence beginning with the A step of the addressed register is started. The contents of the addressed register are unchanged by this command.

The jump mark or jump return command permits program branching with memory of the program register which caused the program branch. As may be seen from FIGS. 1 through 6 it is the fast access storage which contains this memory. The memory consists of the contents of the instruction register when the jump mark command was being executed in the control register. One of the instructions in the fast access register after the jump mark command is the executed A step if the jump mark was the B step or the unexecuted B step if the jump mark command was the A step of the program register which contained the jump mark command. The other instruction is the automatic jump instruction which is always present in the control loop. The address of this automatic jump instruction is one more than the program register which contained the jump mark. This automatic jump instruction would have continued the program sequencing if the jump mark instruction had not been written as either the A or B step. Since this jump is transferred to the fast access register by the jump mark command, any subsequent jump to the fast access register will retransfer program control to the program register after the program register which contained the jump mark command. If the jump mark command was the A step of the program register, the unexecuted B step would be the first instruction performed when control was returned to the fast access register. The automatic jump which actually returns the program to the desired sequence would be executed after this step. If the jump mark was in the B step only the automatic jump is executed when control is returned to the fast access register.

It is of course not necessary to keep the marked instruction in the fast access register. The marked instruction can be transferred to any storage register, allowing fast access to be used for working storage or receiving more mark instructions. To return to the previous sequence, the program would jump to the register where the contents of fast access had been transferred.

The jump mark or jump return instruction makes possible effective use of subroutines in computer apparatus. Entrance to the subroutines is made through the jump mark instruction. Exit from the subroutines is a jump to the register where the mark has been placed. The program then resumes its sequence at the instruction step after the jump mark instruction.

To reiterate briefly the preferred embodiment of the invention utilizes an unconditional jump command which transfers the contents of a storage register, specified by the address portion of the order link, to the control loop. At the end of this operation the carry flip-flop or adder 15 is set so that the address specified by the order link in the shift register will be increased by one when the control or shift register precesses or transfers its contents to the instruction register. This allows the machine to process in sequence the orders in a program. It should be noted that the jump return could be conditional if so desired.

As has been stated previously the jump return command is the same as an unconditional jump command with additional features which transfer the contents of the instruction register to a fast access register. This makes it possible for a programmer to jump out of his program into a subroutine and to return to the next order in his program by jumping to a register at the end of the subroutine.

The jump return command replaces the present jump link of FIGS. 3–6 so it now becomes the new jump link in the orders loop. Therefore, it must be modified to an unconditional jump command before it leaves the shift register at the completion of the operation.

An example of the operation of the jump return will now be illustrated. It should be remembered that while the contents of the storage register addressed are being transferred to the instruction register, the contents of the instruction register are being transferred to the fast access storage register.

In this example, the following storage addresses contain the respective instructions in sexidecimal notation.

| Address: | Instructions |
|---|---|
| 109 | 3450 X005 |
| 108 | V011 T005 |
| 050 | T010 3002 |

| Contents of Fast Access Register | Contents of Instruction Register | Contents of Control Register | Operation Performe |
|---|---|---|---|
| | 3450 X005 | 3109 | Transfer contents of 109 to the control loop. |
| | X005 310S<br>T010 3002 | 3450 | Jump return to 050. |
| X005 310S | 3002 3051 | T010 | Perform the T010 operation. |
| X005 310S | 30510 T010<br>X005 310S | 3002 | Transfer contents of 002 to the control loop. |
| X005 310S | 310S 3003 | X005 | Perform the X005 operation. |
| X005 310S | 3003 X005<br>V011 T005 | 310S | Transfer contents of 10S to the control loop. |
| X005 310S | T005 310T | V011 | Perform the V011 operation. |

As stated previously the jump return order allows the program to branch to a subroutine and then return to the next order in the main program by jumping to fast access storage at the end of the subroutine. Here again the jump return command is automatically modified after execution so that it now becomes an unconditional jump command.

It should be understood that this invention is not limited to specific details of construction and arrangement thereof herein illustrated, and that changes and modifications may occur to one skilled in the art without depart-

What is claimed is:

Apparatus in a computing device for controlling program instructions arranged in addressable storage locations in a general storage, each location containing an instruction word having two instructions any of which may be a jump instruction, the apparatus including a control register for temporarily retaining instruction so as to control the computing device, an instruction register connected with the control register for temporarily retaining at least two instructions and transferring instructions to the control register, a main program having a plurality of instructions, a jump instruction specifying the address of a location in the general storage which jump instruction when transferred into the control register causes a main program instruction word stored in the specified address to be transferred to the instruction register, transfer means for transferring one of the two instructions stored in the instruction register into the control register concurrently with the transfer of the jump instruction out of the control register and into the instruction register, means for modifying the jump instruction during this transfer to specify the address of the next desired main program instruction word, the said transferring means transferring the second of the two instructions into the control register concurrently with the transfer of the first instruction out of the control register into the instrucion register at the conclusion of the operation controlled by the first instruction, the said transfer means further transferring the modified jump instruction back into the control register at the conclusion of the operation controlled by the second instruction whereby the steps of transferring and operating in response to the program instructions proceed alternately, and means for transferring the contents of the instruction register into a predetermined location of the general storage said contents being a modified jump instruction relating to the main program and one other instruction.

References Cited in the file of this patent

UNITED STATES PATENTS 2,927,732     Rinder et al. _____ Mar. 8, 1960
2,957,626     Havens et al. _____ Oct. 25, 1960